(12) United States Patent
Curry

(10) Patent No.: US 12,742,674 B2
(45) Date of Patent: Sep. 22, 2026

(54) WEIGHT TRACKING SYSTEM AND METHOD

(71) Applicant: Eddie Curry, Valdosta, GA (US)

(72) Inventor: Eddie Curry, Valdosta, GA (US)

( * ) Notice: Subject to any disclaimer, the term of this patent is extended or adjusted under 35 U.S.C. 154(b) by 335 days.

(21) Appl. No.: 18/665,793

(22) Filed: May 16, 2024

(65) Prior Publication Data

US 2025/0354853 A1 Nov. 20, 2025

(51) Int. Cl.

*G06K 7/14* (2006.01)
*G01G 19/387* (2006.01)
*G01G 23/18* (2006.01)

(52) U.S. Cl.

CPC ........... *G01G 19/387* (2013.01); *G01G 23/18* (2013.01); *G06K 7/1413* (2013.01)

(58) Field of Classification Search

CPC ..... G06K 7/1413; G01G 19/387; G01G 23/18
See application file for complete search history.

(56) References Cited

U.S. PATENT DOCUMENTS 3,831,687 A 8/1974 Maffia
4,139,070 A 2/1979 Hanson
4,446,524 A 5/1984 Wendt
D419,473 S 1/2000 Arnold
8,696,516 B2 4/2014 Shibata et al.
8,841,564 B1 * 9/2014 Roberts, Sr. ......... G01G 19/083 177/139
10,072,966 B1 * 9/2018 Frankel .................. G01G 19/00
10,139,265 B2 * 11/2018 Fuss ..................... G06K 7/1413
11,105,674 B2 * 8/2021 Gregory ................. A47G 23/12
11,680,844 B2 6/2023 Marivoet
2003/0127253 A1 7/2003 Heyn
2019/0112104 A1 * 4/2019 Whitman .................. B60P 1/00
2023/0281592 A1 * 9/2023 Sano .................... G07G 1/0072
2025/0371483 A1 * 12/2025 Fox ........................ G01G 19/12

FOREIGN PATENT DOCUMENTS

GB 1551908 9/1979

* cited by examiner

*Primary Examiner* — Natalie Huls

(57) ABSTRACT

A weight tracking system for tracking weights of articles to be shipped includes a weighing device and a scale processor in communication with the weighing device. The scale processor is configured to receive weight data from the weighing device. A plurality of first identification tags is positioned proximate the weighing device, and a plurality of second identification tags is positioned remotely from the weighing device. Each first identification tag includes indicia associated with a respective destination of a plurality of destinations, and each second identification tag includes indicia associated with a respective destination of the plurality of destinations. Each second identification tag of the plurality of second identification tags is positioned adjacent to the respective destination. A remote electronic device is in wireless communication with the scale processor which comprises a tag reader configured to read the indicia of the first and second identification tags.

10 Claims, 8 Drawing Sheets

10
16
28
22
36
12

WEIGHT TRACKING SYSTEM AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to weight tracking systems and more particularly pertains to a new weight tracking system for tracking weights of articles to be shipped.

(2) Description of Related Art Including Information Disclosed Under 37 CFR 1.97 and 1.98

The prior art relates to weighing devices which save measured weight values and generate total weights from them. However, the prior art fails to describe a system which uses remote electronic devices to ensure articles are brought to correct destinations by reading tags positioned proximate the destinations. Such a system is advantageous because it may provide an accurate measurement of the total weight placed on a shipping vehicle and also ensures that articles are brought to correct loading destinatations.

BRIEF SUMMARY OF THE INVENTION

An embodiment of the disclosure meets the needs presented above by generally comprising a weighing device and a scale processor in communication with the weighing device. The scale processor is configured to receive weight data from the weighing device. A plurality of first identification tags is positioned proximate the weighing device, and a plurality of second identification tags is positioned remotely from the weighing device. Each first identification tag includes indicia associated with a respective destination of a plurality of destinations, and each second identification tag includes indicia associated with a respective destination of the plurality of destinations. Each second identification tag of the plurality of second identification tags is positioned adjacent to the respective destination. A scale transceiver is operatively coupled to the scale processor. A remote electronic device is in wireless communication with the scale processor via the scale transceiver. The remote electronic device comprises a tag reader configured to read the indicia of the first and second identification tags.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
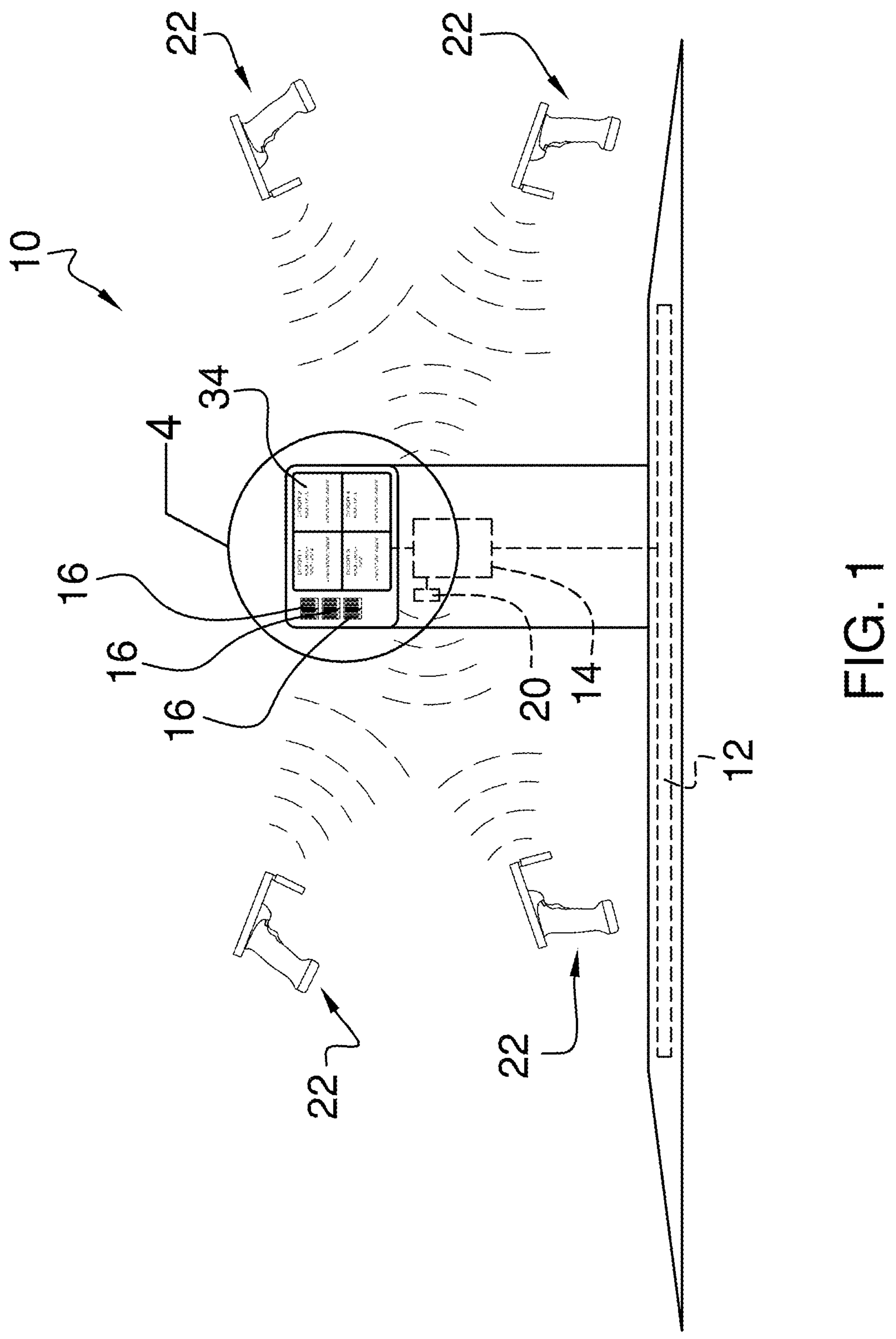
FIG. 1 is a system view of a weight tracking system according to an embodiment of the disclosure.
Figure 2:
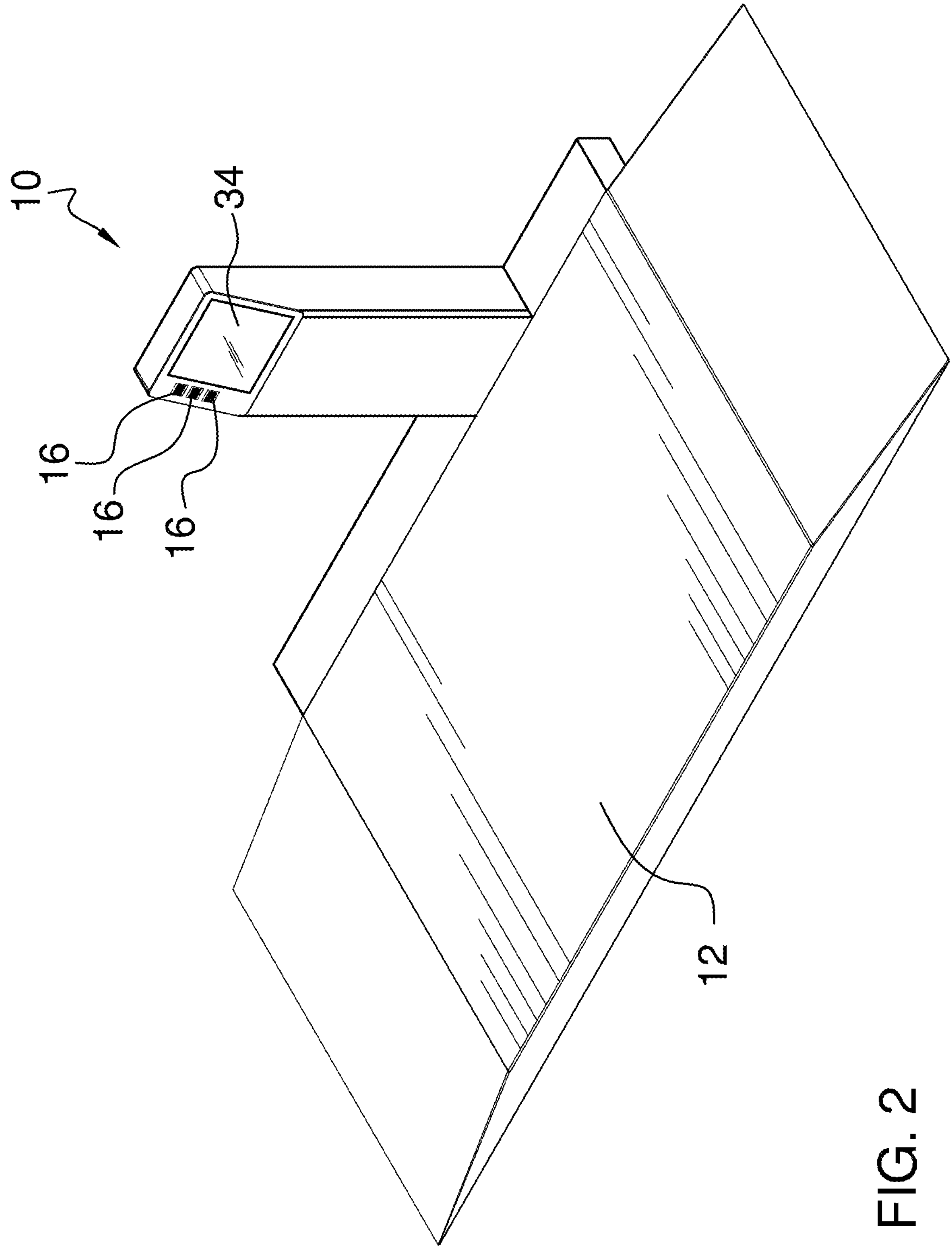
FIG. 2 is a perspective view of a weighing device of an embodiment of the disclosure.
Figure 3:
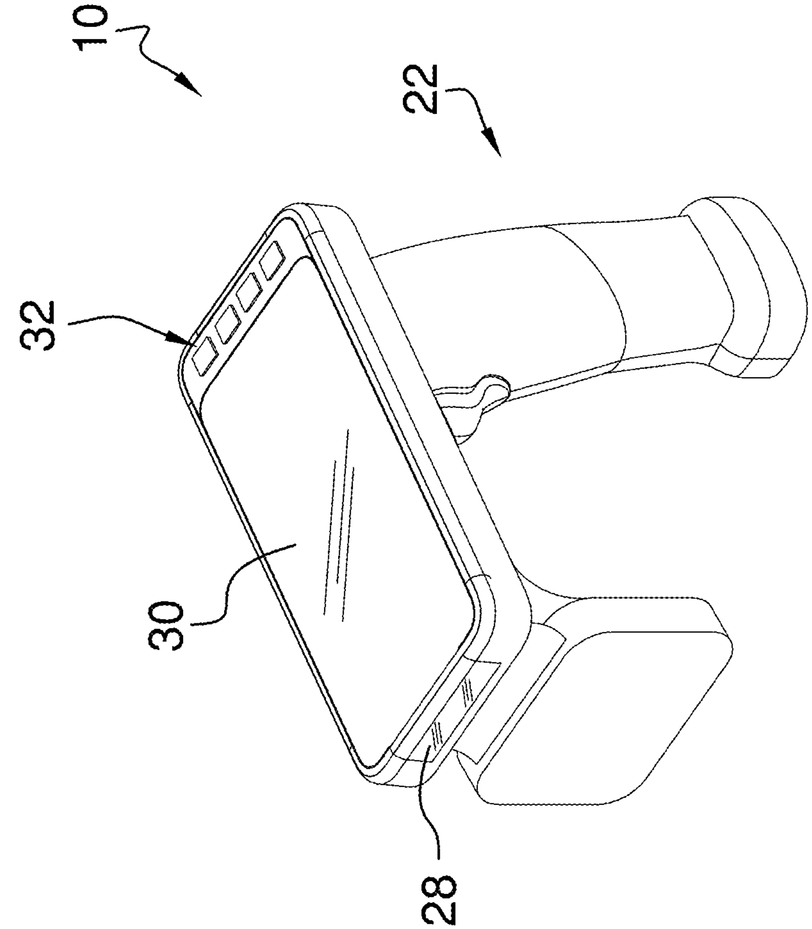
FIG. 3 is a perspective detail view of a remote electronic device of an embodiment of the disclosure.
Figure 4:
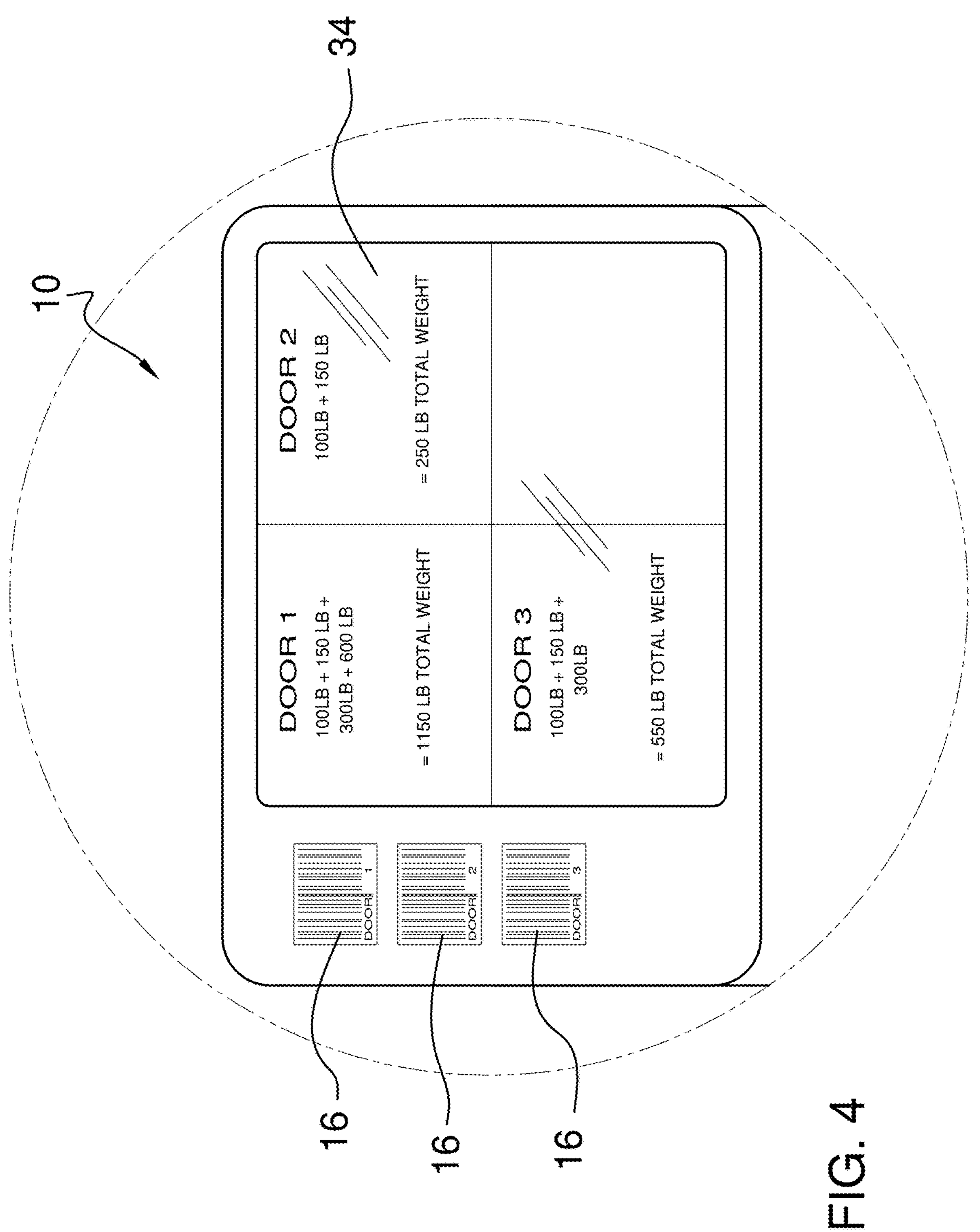
FIG. 4 is a detail view of a scale display of an embodiment of the disclosure taken from Window 4 in FIG. 1.
Figure 5:
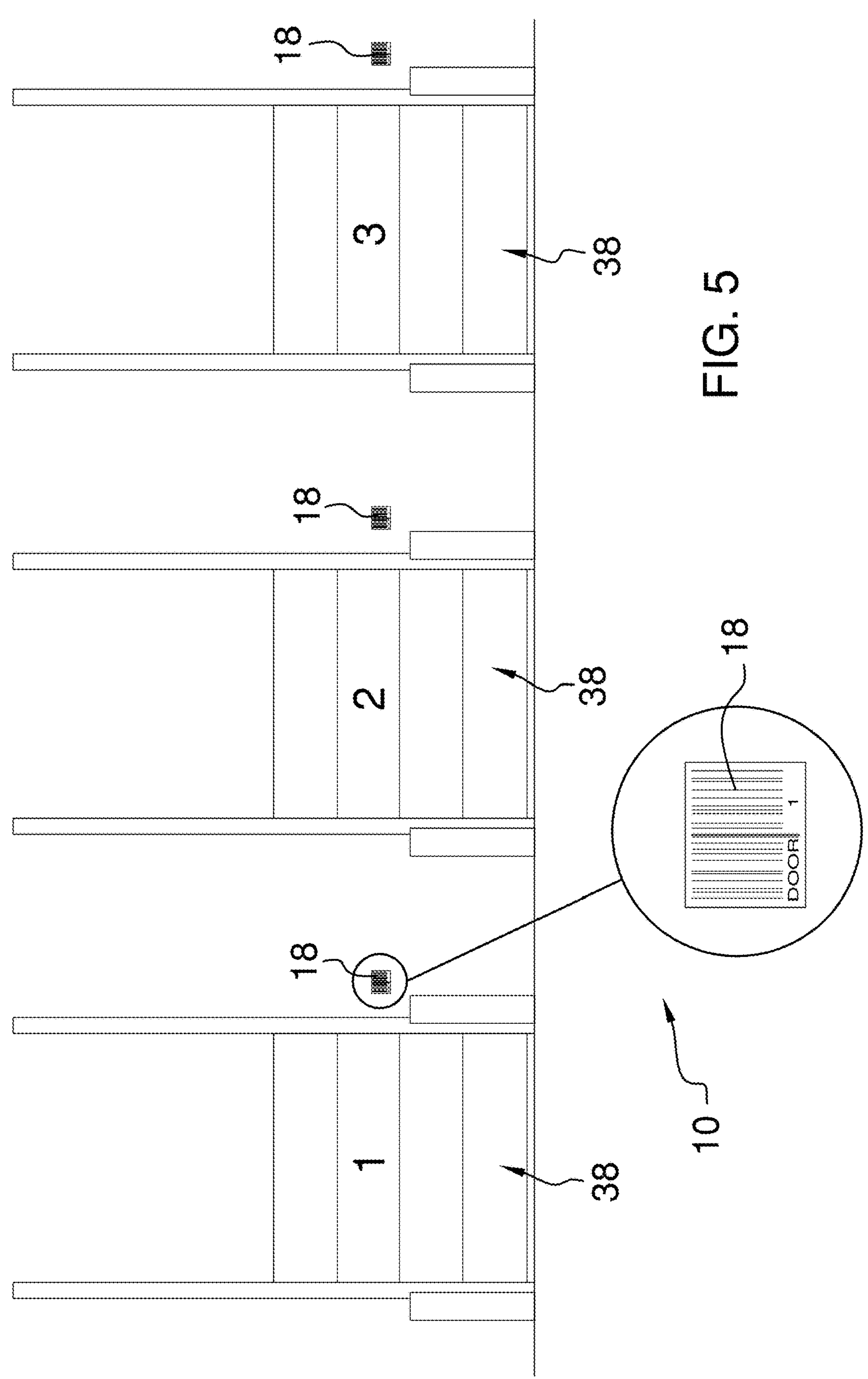
FIG. 5 is a front view of a plurality of destinations used with an embodiment of the disclosure.
Figure 6:
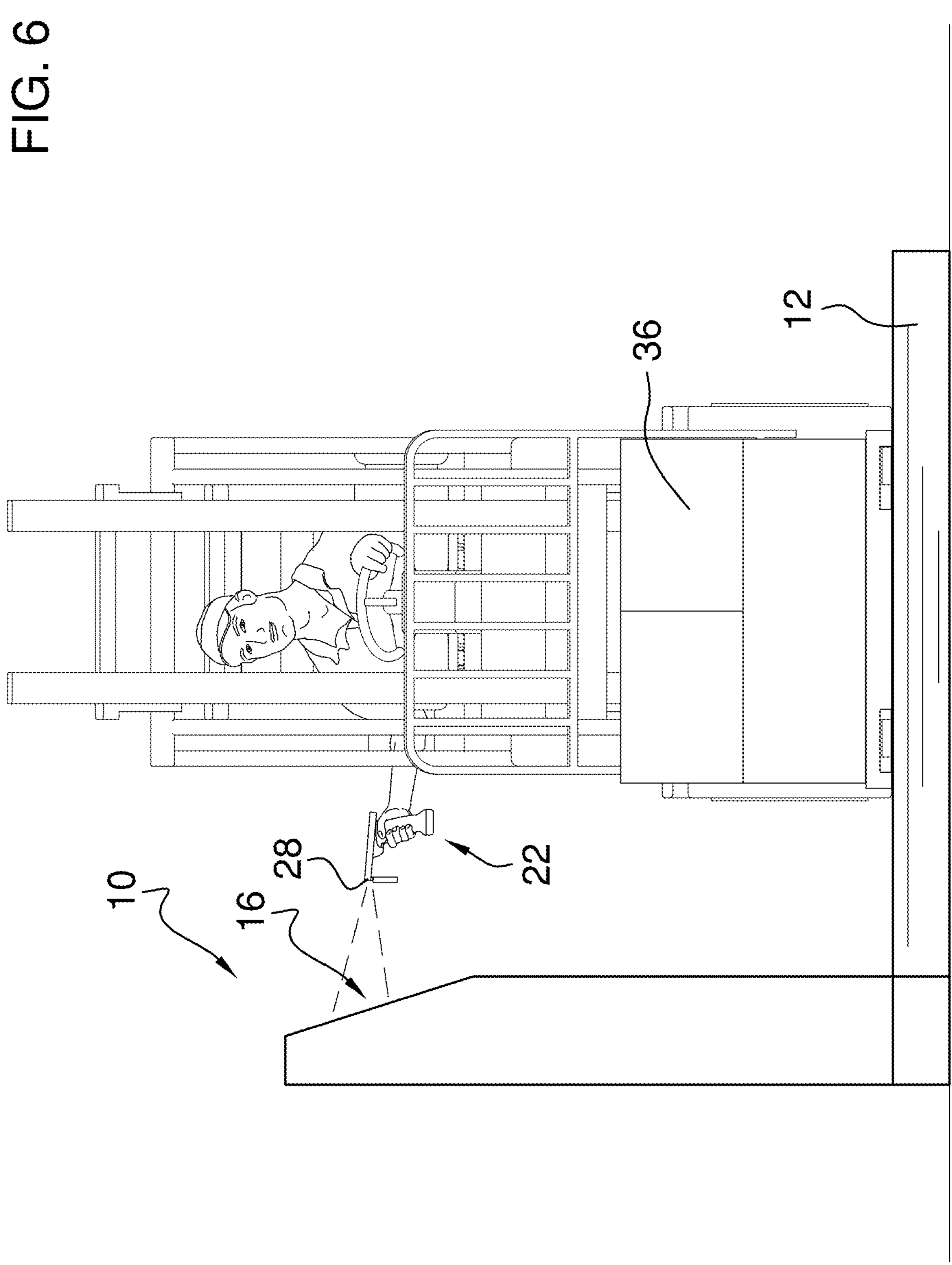
FIG. 6 is an in-use view of an embodiment of the disclosure in which a user holding a remote electronic device scans a first identification tag while bringing a selected article to a weighing device via a forklift.
Figure 7:
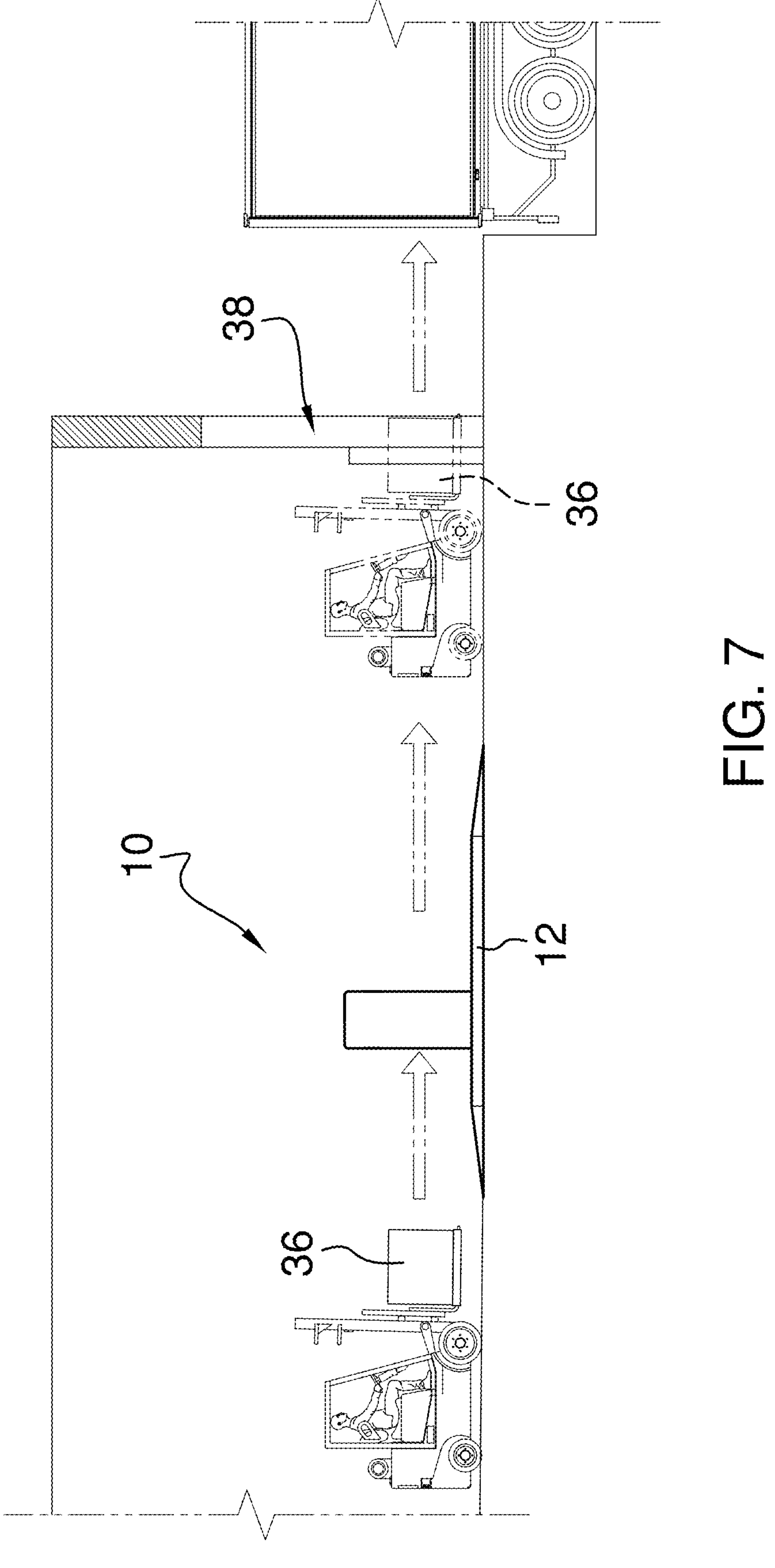
FIG. 7 is an in-use view of an embodiment of the disclosure in which a user brings a selected article to a weighing device, then to a desired destination for the selected article.
Figure 8:
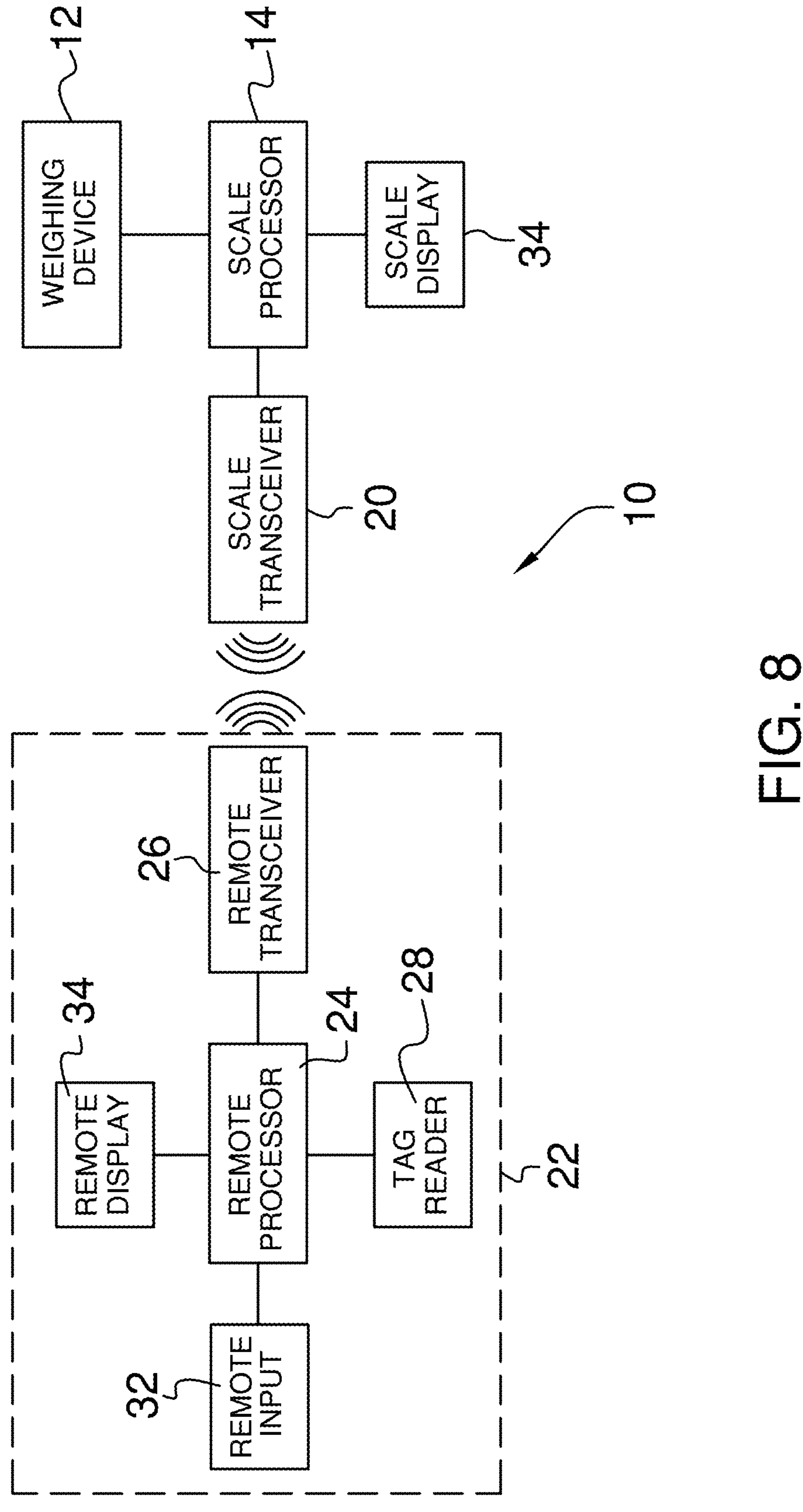
FIG. 8 is a block diagram of an embodiment of the disclosure.

With reference now to the drawings, and in particular to FIGS. 1 through 8 thereof, a new weight tracking system embodying the principles and concepts of an embodiment of the disclosure and generally designated by the reference numeral 10 will be described.

As best illustrated in FIGS. 1 through 8, the weight tracking system 10 generally comprises a weighing device 12 and a scale processor 14 in communication with the weighing device 12 such that the scale processor 14 is configured to receive weight data from the weighing device 12. A plurality of first identification tags 16 is positioned proximate the weighing device 12, and a plurality of second identification tags 18 positioned remotely from the weighing device 12. Each first identification tag 16 includes indicia associated with a respective destination 38 of a plurality of destinations 38 and an associated second identification tag 18 of the plurality of second identification tags 18. Each second identification tag 18 is positioned adjacent to the respective destination 38. A scale transceiver 20 is operatively coupled to the scale processor 14.

A plurality of remote electronic devices 22 is in wireless communication with the scale processor 14 via the scale transceiver 20. Each remote electronic device 22 of the plurality of remote electronic devices 22 comprises a remote processor 24, a remote transceiver 26, a tag reader 28, a remote display 30, and a remote input 32. The remote processor 24 is operatively coupled to the remote transceiver 26, the tag reader 28, the remote display 30, and the remote input 32. The remote transceiver 26 is in wireless communication with the scale transceiver 20. The remote input 32 is operable to control the remote transceiver 26 and send instructions to the scale transceiver 20. The remote input 32 may include buttons, a touchscreen integral with the display, or any other suitable input means.

The tag reader 28 is configured to read the indicia of the first and second identification tags 16, 18. The first and second identification tags 16, 18 comprise barcodes, and the tag reader 28 comprises a barcode scanner. However, in other embodiments, identification tags such as a quick-response code, a radio frequency identification (RFID) tag, or any other suitable tag may be used, and the tag reader 28 may comprise the associated device sufficient for reading such a tag.

The scale processor 14 is programmed to store weight data corresponding to various articles 36 such as palletized loads, barrels, or any other suitable items which are intended to be transported to the various destinations 38 in some combination. The destinations 38 may be doors, trucks, or the like associated with shipping the various articles 36 to farther locations. The scale processor 14 associates the weight data with the appropriate destination 38 and calculates a total weight of the articles 36 which are to be moved to each destination 38. A scale display 34 is operatively coupled to the scale processor 14, and the scale processor 14 is configured to present the weight data corresponding to each destination 38 of the plurality of destinations 38, which is measured by the weighing device 12, on the scale display 34.

The system 10 is used to track weights of articles 36 moved to each destination 38, such as when preparing to ship truckloads or the like comprising sets of the articles 36 on separate trucks or other shipping vehicles. A selected article 36 is placed on the weighing device 12 which measures a weight value of the selected article 36. One of the remote electronic devices 22 is operated to read a selected first identification tag 16 which is associated with a desired destination 38 of the plurality of destinations 38 for the selected article 36. Data is transmitted to the scale processor 14 to communicate which destination 38 has been selected. The weight of the selected article 36 is added to a log associated with the desired destination 38 and the selected first identification tag 16 by inputting as much.

For example, if the selected article 36 is meant to be brought through a destination 38 referred to as "Door 1," the weight of the article 36 is added to a log of weights associated with "Door 1" by reading the first identification tag 16 associated with "Door 1." Adding the weight may be done by inputting a command via the remote input 32 of the one remote electronic device 22, a scale input in wired communication with the scale processor 14, or any other suitable input.

In this manner, a total weight of articles 36 brought to "Door 1" and the other destinations 38 is tracked. Separate weights of articles 36 for each destination 38 are also retained. For example, in the log for "Door 1," articles 36 weighing 100 pounds, 150 pounds, 300 pounds, and 600 pounds may be added sequentially according to the process described above. The log records the separate weights and totals them for a total weight associated with "Door 1." The same may be displayed on the scale display 34, such as in FIG. 4, by showing the separate weights of the separate articles 36 to be brought through "Door 1" followed by a total weight for the same.

The process further includes steps to ensure that articles 36 are brought to the correct destination 38. After adding the weight value of the selected article 36 to the total weight value associated with the desired destination 38, the selected article 36 is moved near a selected second identification tag 18 of the plurality of second identification tags 18. The selected second identification tag 18 is read via the one remote electronic device 22. Programming on the scale processor 14, the remote processor 24 of the one remote electronic device 22, or elsewhere determines whether the selected second identification tag 18 matches the selected first identification tag 16. If they match, a confirmation notification is presented on the one remote electronic device 22 and the one remote electronic device 22 is allowed to read more identification tags for further articles 36. However, they don't match, an error notification is presented on the one remote electronic device 22 and the one remote electronic device 22 is prevented from reading further identification tags until the selected article 36 is brought to the desired destination 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A weight tracking system comprising:

a weighing device;

a scale processor in communication with the weighing device, the scale processor being configured to receive weight data from the weighing device;

a plurality of first identification tags positioned proximate the weighing device, each first identification tag including indicia associated with a respective destination of a plurality of destinations;

a plurality of second identification tags positioned remotely from the weighing device, each second identification tag including indicia associated with a respective destination of the plurality of destinations, each second identification tag of the plurality of second identification tags being positioned adjacent to the respective destination;

a scale transceiver being operatively coupled to the scale processor; and a remote electronic device in wireless communication with the scale processor via the scale transceiver, the remote electronic device comprising a tag reader configured to read the indicia of the first and second identification tags.

2. The system of claim 1, wherein the first and second identification tags comprise barcodes, the tag reader comprising a barcode scanner.

3. The system of claim 1, wherein the remote electronic device further comprises:

a remote processor operatively coupled to the tag reader;

a remote transceiver operatively coupled to the remote processor, the remote transceiver being in wireless communication with the scale transceiver;

a remote display operatively coupled to the remote processor; and a remote input operatively coupled to the remote processor.

4. The system of claim 1, further comprising a scale display operatively coupled to the scale processor, the scale processor being configured to present weight data measured by the weighing device corresponding to each destination of the plurality of destinations on the scale display.

5. A weight tracking system comprising:

a weighing device;

a scale processor in communication with the weighing device, the scale processor being configured to receive weight data from the weighing device;

a plurality of first identification tags positioned proximate the weighing device, each first identification tag including indicia associated with a respective destination of a plurality of destinations;

a plurality of second identification tags positioned remotely from the weighing device, each second identification tag including indicia associated with a respective destination of the plurality of destinations, each second identification tag of the plurality of second identification tags being positioned adjacent to the respective destination;

wherein the first and second identification tags comprise barcodes;

a scale transceiver being operatively coupled to the scale processor;

a plurality of remote electronic devices in wireless communication with the scale processor via the scale transceiver, each remote electronic device of the plurality of remote electronic devices comprising:

a remote processor;

a remote transceiver operatively coupled to the remote processor, the remote transceiver being in wireless communication with the scale transceiver;

a tag reader operatively coupled to the remote processor, the tag reader being configured to read the indicia of the first and second identification tags, the tag reader comprising a barcode scanner;

a remote display operatively coupled to the remote processor; and a remote input operatively coupled to the remote processor; and a scale display operatively coupled to the scale processor, the scale processor being configured to present weight data measured by the weighing device corresponding to each destination of the plurality of destinations on the scale display.

6. A method of tracking weight of articles transported to a plurality of destinations, the method comprising:

placing a selected article on a weighing device, whereby the weighing device measures a weight value of the selected article;

reading, via a remote electronic device, a selected first identification tag of a plurality of first identification tags, wherein each first identification tag of the plurality of first identification tags is associated with a respective destination of a plurality of destinations, wherein the selected first identification tag is associated with a desired destination of the plurality of destinations, wherein the plurality of first identification tags is positioned proximate the weighing device;

adding, via a scale processor in communication with the weighing device, the weight value to a total weight value associated with the desired destination;

moving the selected article near a selected second identification tag of a plurality of second identification tags, wherein each second identification tag of the plurality of second identification tags is associated with a respective destination of the plurality of destinations, wherein each second identification tag of the plurality of second identification tags is positioned proximate the respective destination;

reading, via the remote electronic device, the selected second identification tag;

presenting, via the remote electronic device, a confirmation notification if the selected second identification tag is associated with the desired destination;

moving the selected article to the desired destination if the confirmation notification was presented; and presenting, via the remote electronic device, an error notification if the selected second identification tag is not associated with the desired destination.

7. The method of claim 6, wherein the first and second identification tags comprise barcodes.

8. The method of claim 6, further comprising retaining, via the scale processor, separate weight values measured for separate articles.

9. The method of claim 8, further comprising presenting, via a scale display in communication with the scale processor, the separate weight values and the total weight values for each destination of the plurality of destinations.

10. The method of claim 6, further comprising presenting, via a scale display in communication with the scale processor, the total weight values for each destination of the plurality of destinations.

* * * * *